(12) United States Patent
Inayama

(10) Patent No.: US 6,960,049 B2
(45) Date of Patent: Nov. 1, 2005

(54) INSERT, HOLDER AND CUTTING TOOL

(75) Inventor: Takashi Inayama, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 51 days.

(21) Appl. No.: 10/601,849

(22) Filed: Jun. 24, 2003

(65) Prior Publication Data

US 2004/0022592 A1 Feb. 5, 2004

(30) Foreign Application Priority Data

Jun. 25, 2002 (JP) .................................... P2002-185267

(51) Int. Cl.[7] ................................................ B23C 1/00
(52) U.S. Cl. ........................ 407/103; 407/113; 407/66
(58) Field of Search ................................ 407/103, 102, 407/113, 114, 115, 101, 66, 48

(56) References Cited

U.S. PATENT DOCUMENTS

| | | | |
|---|---|---|---|
| 5,360,298 A | | 11/1994 | Hedlund |
| 5,555,784 A | | 9/1996 | Muendlein et al. |
| 5,810,518 A | * | 9/1998 | Wiman et al. ............... 407/102 |
| 5,924,826 A | * | 7/1999 | Bystrom et al. ............. 407/103 |
| 6,736,574 B2 | * | 5/2004 | Persson et al. ................ 407/77 |

FOREIGN PATENT DOCUMENTS

| | | |
|---|---|---|
| CH | 686935 | 8/1996 |
| FR | 2 431 897 | 7/1978 |
| FR | 2 795 665 A1 | 1/2001 |
| WO | WO 95/29026 A1 | 11/1995 |
| WO | WO 99-00208 | 1/1999 |
| WO | WO 01/00360 | 1/2001 |
| WO | WO 02/055245 A1 | 7/2002 |
| WO | WO 02/072300 | 9/2002 |

* cited by examiner

*Primary Examiner*—Willmon Fridie, Jr.
(74) *Attorney, Agent, or Firm*—Sughrue Mion, PLLC

(57) ABSTRACT

A cutting tool has an insert shaped as a parallelogram that is detachably mounted by a clamp screw 4 on a tip mounting face of a holder. Concave grooves are formed like parallel stripes on the tip mounting face of the holder, and convex lines are formed on the abdominal face of the insert to be fitted in the concave grooves, so that the insert is clamped by the clamp screw to the holder in a state where the convex lines are fitted in the concave grooves on the tip mounting face.

13 Claims, 7 Drawing Sheets

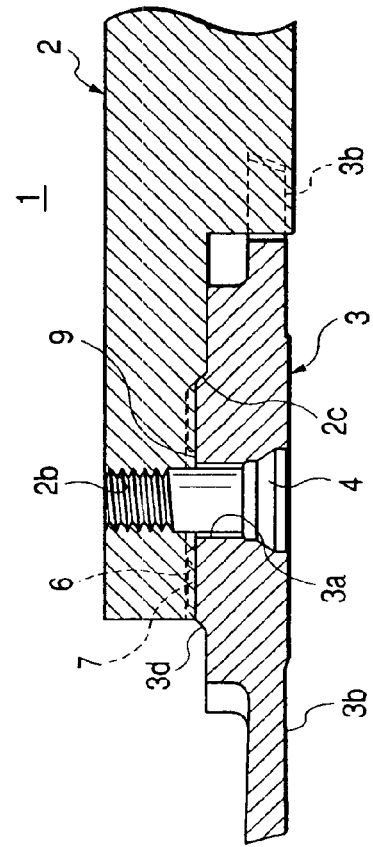
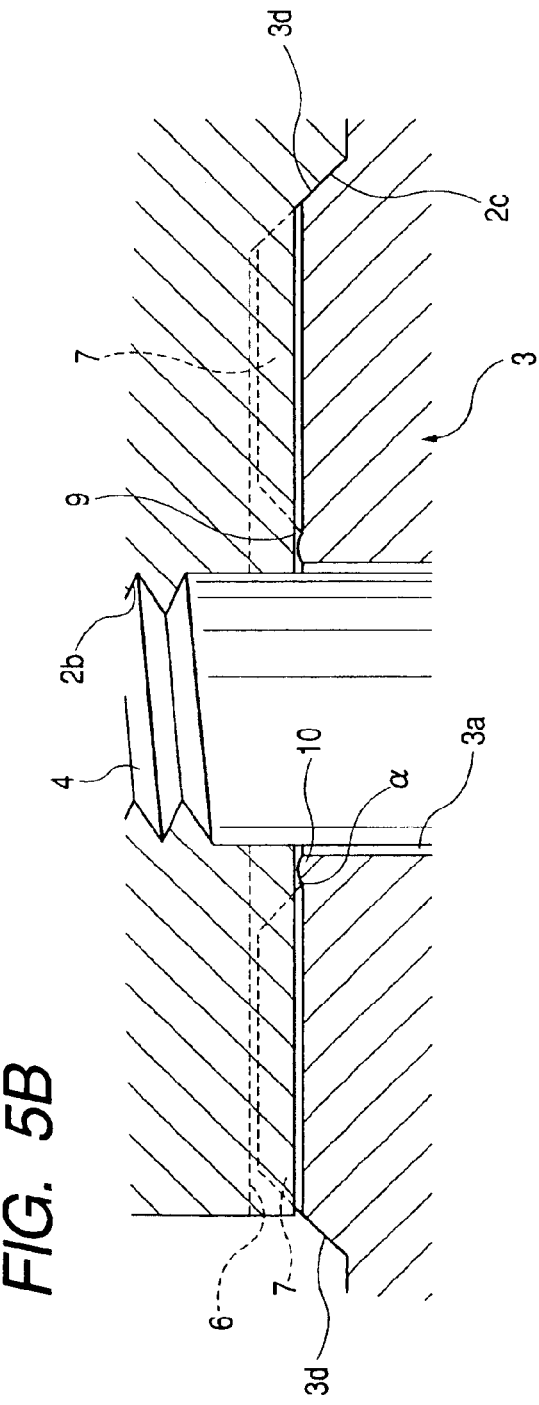
FIG. 5A
FIG. 5B

US 6,960,049 B2

INSERT, HOLDER AND CUTTING TOOL

CROSS-REFERENCE TO RELATED APPLICATIONS

This application claims the priority of Japanese Patent Application No. 2002-185267, filed on Jun. 25, 2002, in the Japanese Patent Office, the disclosure of which is incorporated herein in its entirety by reference.

BACKGROUND OF THE INVENTION

The present invention relates to an insert and a holder of a cutting tool. More particularly, the insert is brought into engagement with the holder with concave and convex grooves to provide a secure engagement.

Conventionally, there is a cutting tool 104 in which an insert 102 having a basic form of parallelogram is detachably mounted by a clamp screw 103 as a clamping member on a tip mounting face 101 of a holder 100 (see FIG. 8). The holder 100 of this cutting tool 104 has the flat tip mounting face 101 provided with a female thread hole 105 into which the clamp screw 103 is screwed, and a restricting wall 106 protruding on the tip mounting face 101, for restricting the movement of the insert 102 at two sides of the insert 102. Such a cutting tool 104 is mainly employed for cutting-off, grooving, cutting with a saw, and thread cutting work, in which a force applied on the insert 102 at the time of cutting is supported on the restricting wall 106 of the holder 100.

Usually, the insert 102 having a basic form of a parallelogram is provided with the cutting edges 102a in two corner portions of acute angle that are located in point symmetry around the clamp screw 103, and when one cutting edge 102a is worn, the other cutting edge 102a is used by rotating the insert 102. Further, the cutting edge 102 rotated on the backside makes contact with the restricting wall 106 of the holder 100 to restrict the movement of the insert 102.

By the way, the cutting edge 102a of the insert 102 may be broken during the cutting work. Particularly, because the insert 102 for cutting-off or grooving work has a thinner cutting edge portion, as shown in FIG. 8, most of the cutting edge 102a may be possibly broken away. When rotated on the backside, the cutting edge 102a has an important role of making contact with the restricting wall 106 of the holder 100 to restrict the movement of the insert 102. Thereby, if that portion is missing, the restricting force of the insert 102 is weakened, and the cutting tool may possibly become unusable.

SUMMARY OF THE INVENTION

This invention is achieved in the light of the above-mentioned problems, and it is an object of the invention to provide an insert, a holder and a cutting tool in which even if one cutting edge portion is missed, the use of another cutting edge is allowed.

of the first aspect of the invention provides an insert having a basic form of parallelogram or rectangle that is detachably mounted by a clamping member on a tip mounting face of a holder, wherein two or more concave grooves are formed like parallel stripes on the tip mounting face of the holder, and two or more convex lines are formed on its own abdominal face to be fitted in the concave grooves, in which the insert is clamped by the clamping member in a state where its own convex lines are fitted in the concave grooves on the tip mounting face. The clamping member as a screw clamp structure fixes the insert by tightening a clamp screw through its own screw insertion hole into a female thread hole on the tip mounting face, and a convex line missing part is provided in a region including the periphery of an opening edge of the screw insertion hole and opposed to the tip mounting face of the holder, in which the tip mounting face and the convex line missing part are out of contact at least before tightening the clamp screw.

Further, the present invention provides a holder for holding an insert that is detachably mounted by a clamping member on its own tip mounting face, wherein two or more concave grooves are formed like parallel stripes on an abdominal face of the insert, and two or more convex lines are formed on its own tip mounting face to be fitted in the concave grooves, in which the insert is clamped by the clamping member in a state where the concave grooves of the insert are fitted in the convex lines on the tip mounting face. The clamping member as a screw clamp structure fixes the insert by tightening a clamp screw through a screw insertion hole of the insert into a female thread hole on its own tip mounting face, and a convex line missing part is provided in a region including the periphery of an opening edge of the screw insertion hole and opposed to the insert, in which the insert and the convex line missing part are out of contact at least before tightening the clamp screw.

Because the tip mounting face of the holder and the abdominal face of the insert are securely integrated by engagement between a plurality of concave grooves and convex lines, the restricting wall is not indispensable with the conventional holder. Accordingly, even if one cutting edge of the insert is broken away, another cutting edge is usable without being affected.

Further, in working the screw insertion hole or the female thread hole, the periphery of the opening edge of hole may be swollen and deformed in some cases, in which the convex line missing part is provided in that portion to prevent the tip mounting face and the insert from being connected, thereby enhancing the mounting precision of the insert.

The convex lines and the concave grooves are an integral concept of representing the mating relation, in which a concave groove is located between each of the convex lines and a convex line is located between each of the concave grooves. Accordingly, the convex lines and the concave grooves, which are mated with each other, make almost the same operation, and are appropriately used for the sake of convenience in this invention.

The number of concave grooves or convex lines are optimally three to five deducing the functional size of the concave grooves or convex lines from the standard area of the tip mounting face.

Further, a step portion is formed on the abdominal face of the insert in a direction crossing the convex lines or concave grooves, the step portion being engaged in the engagement step portion provided on the holder, whereby the insert is completely restricted only by mating the abdominal face of the insert and the tip mounting face of the holder.

BRIEF DESCRIPTION OF THE DRAWINGS

The above and other features and advantages of the present invention will become more apparent by describing in detail exemplary embodiments thereof with reference to the attached drawings, in which:

FIG. 5A is a transversal plan view showing an essential part of the cutting tool and FIG. 5B is a partially enlarged view of FIG. 5A;

DETAILED DESCRIPTION OF THE EXEMPLARY EMBODIMENTS OF THE PRESENT INVENTION

Figure 1:
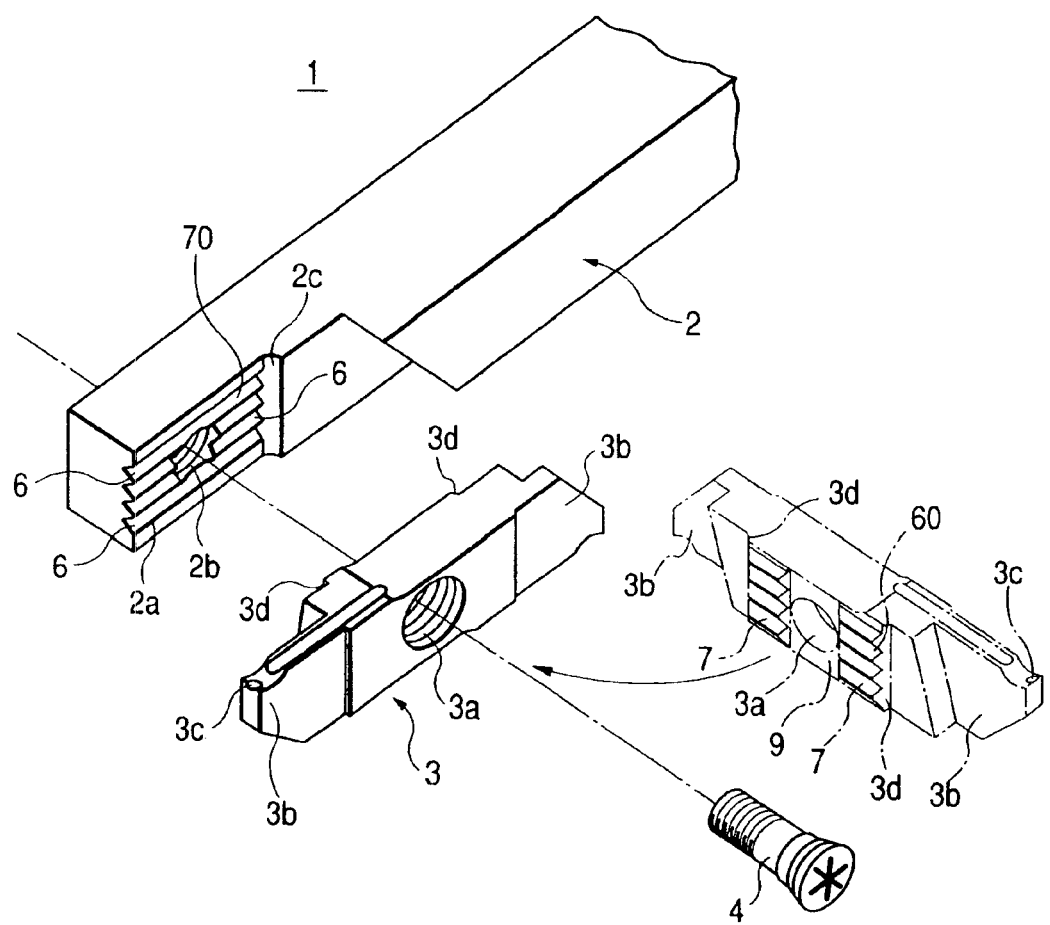
FIG. 1 is an exploded perspective view of a cutting tool.
Figure 2:
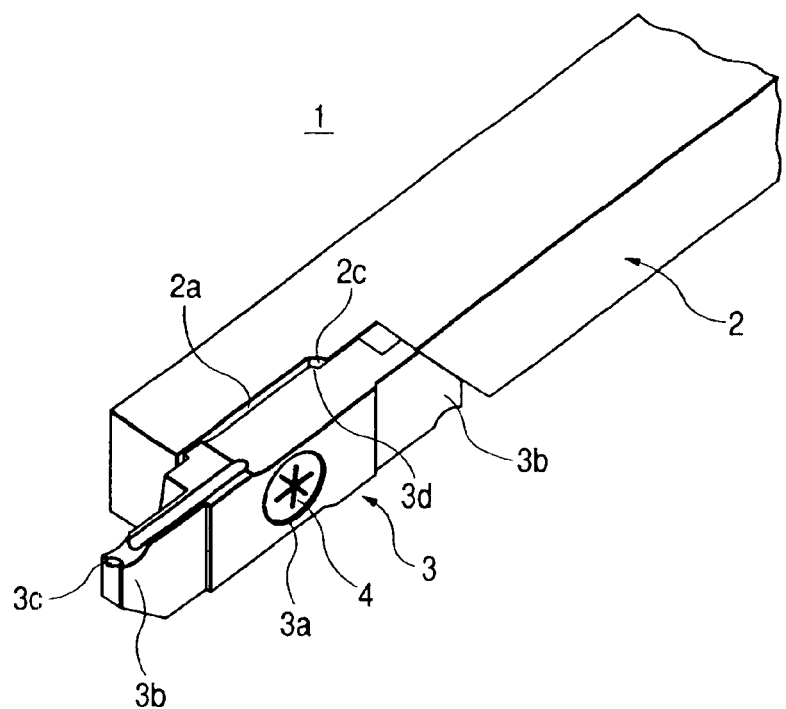
FIG. 2 is a perspective view of the cutting tool.
Figure 3:
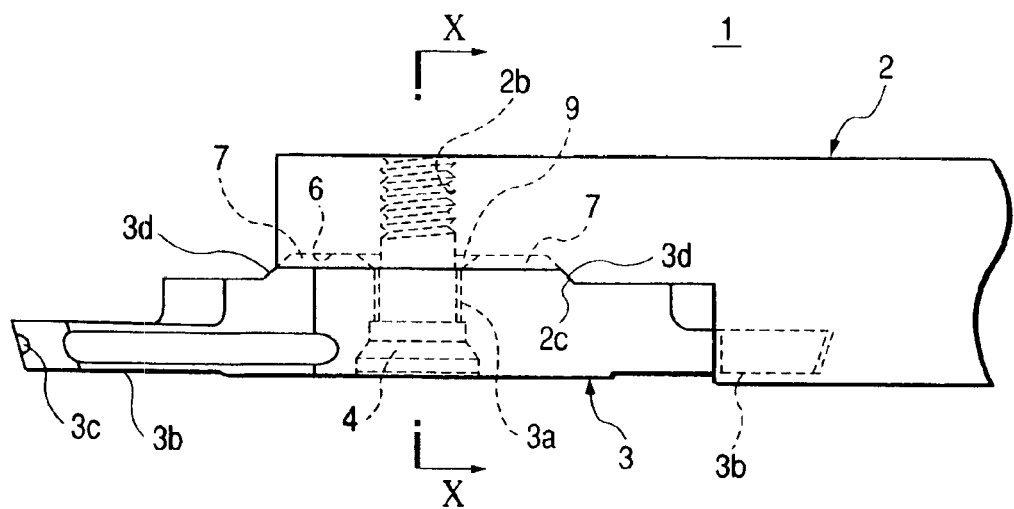
FIG. 3 is a plan view of an essential part of the cutting tool.
Figure 6:
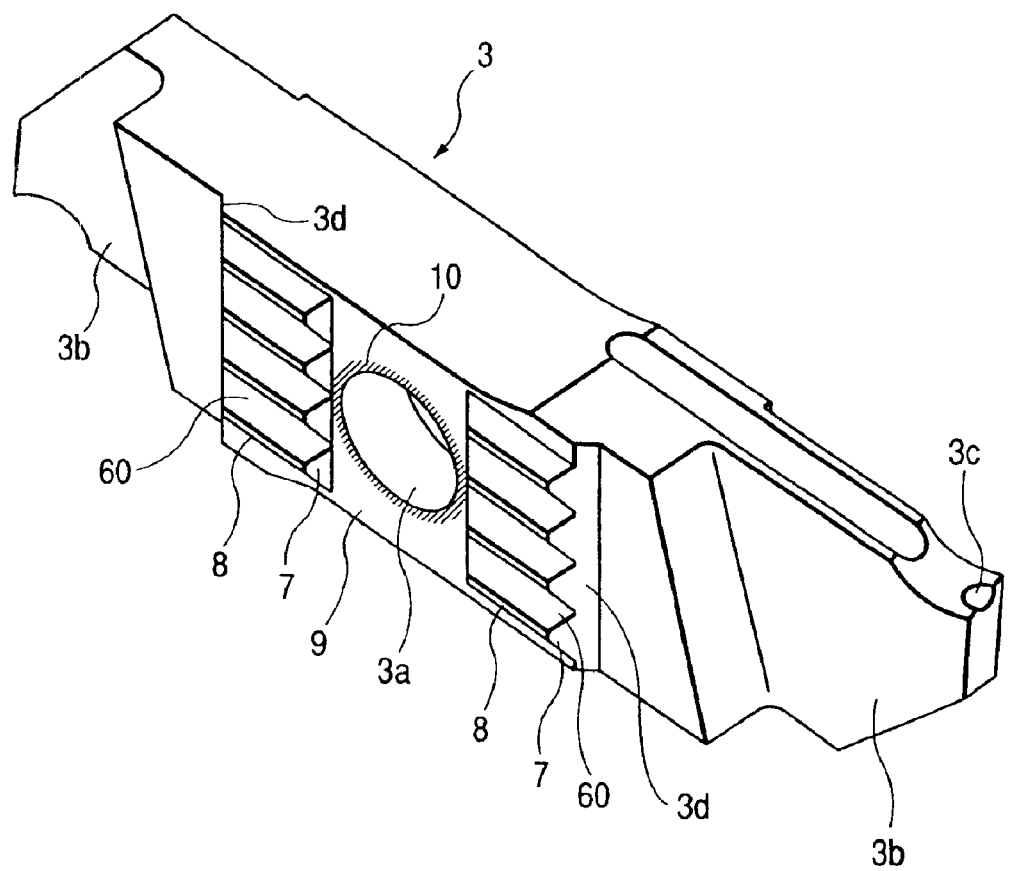
FIG. 6 is a perspective view of an insert.

Referring to FIGS. 1 to 6, a first exemplary embodiment of the present invention will be described below. FIG. 1 is an exploded perspective view of a cutting tool, FIG. 2 is a perspective view of the cutting tool, FIG. 3 is a plan view of an essential part of the cutting tool, FIG. 4A is a cross-sectional view taken along line X—X of FIG. 3, FIG. 4B is a partially enlarged view of FIG. 4A, FIG. 5A is a transversal plan view showing an essential part of the cutting tool, FIG. 5B is a partially enlarged view of FIG. 5A, and FIG. 6 is a perspective view of an insert.

The cutting tool 1 is composed of three components, a holder 2, an insert 3 and a clamp screw 4 as clamping member, as shown in FIG. 1. The holder 2 has a tip mounting area in a top portion lowered by one step, in which a top end portion further lowered by one step in the tip mounting area is a tip mounting face 2a. On this tip mounting face 2a, four concave grooves 6, similar to a V-shape, are formed in parallel and at an equal pitch to make stripes, in which a female thread hole 2b engaged by the clamp screw 4 is formed in the center of the group of concave grooves 6 in the length and height directions (i.e., center of the tip mounting face 2a). Further, the tip mounting face 2a is located at the top end portion lowered by one step in the tip mounting area, in which a boundary portion with a step difference is an engagement step portion 2c crossing at right angles to the concave grooves 6. This engagement step portion 2c is an inclined face. Between adjacent concave grooves 6, 6 is a convex line 70 like a ridge in section and having a chamfered portion 80 at the top portion (see FIG. 4B).

On the other hand, the insert 3 has a basic form of a parallelogram, in which a screw insertion hole 3a for inserting the clamp screw 4 is provided in the center of parallelogram, and two cutting edges 3b with smaller thickness are provided at two corner portions of acute angle that are located in symmetry around the screw insertion hole 3a. Further, a dimple groove 3c for cutting work is formed on a knife-edge rake face at the top end of a cutting edge 3b. An abdominal face of the insert 3 (a face for contacting with the tip mounting face 2a of the holder 2) has four convex lines 7, like a ridge in section, to be fitted into the concave grooves 6 of the tip mounting face 2a and having a chamfered portion 8 at the top end, are protruded in parallel and at an equal pitch, and a step portion 3d engaging the engagement step portion 2c of the holder 2 is formed at both end portions of the convex lines 7. Between adjacent convex lines 7, 7 is a concave groove 60 having a V-shape in section.

Figure 4A:
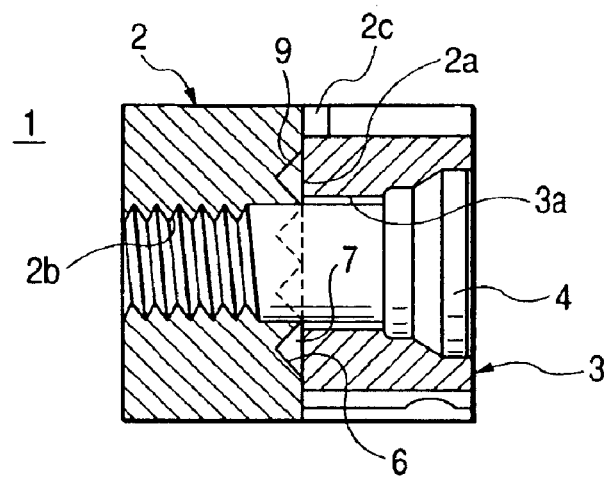
FIG. 4A is a cross-sectional view taken along the line X—X of FIG. 3.
Figure 4B:
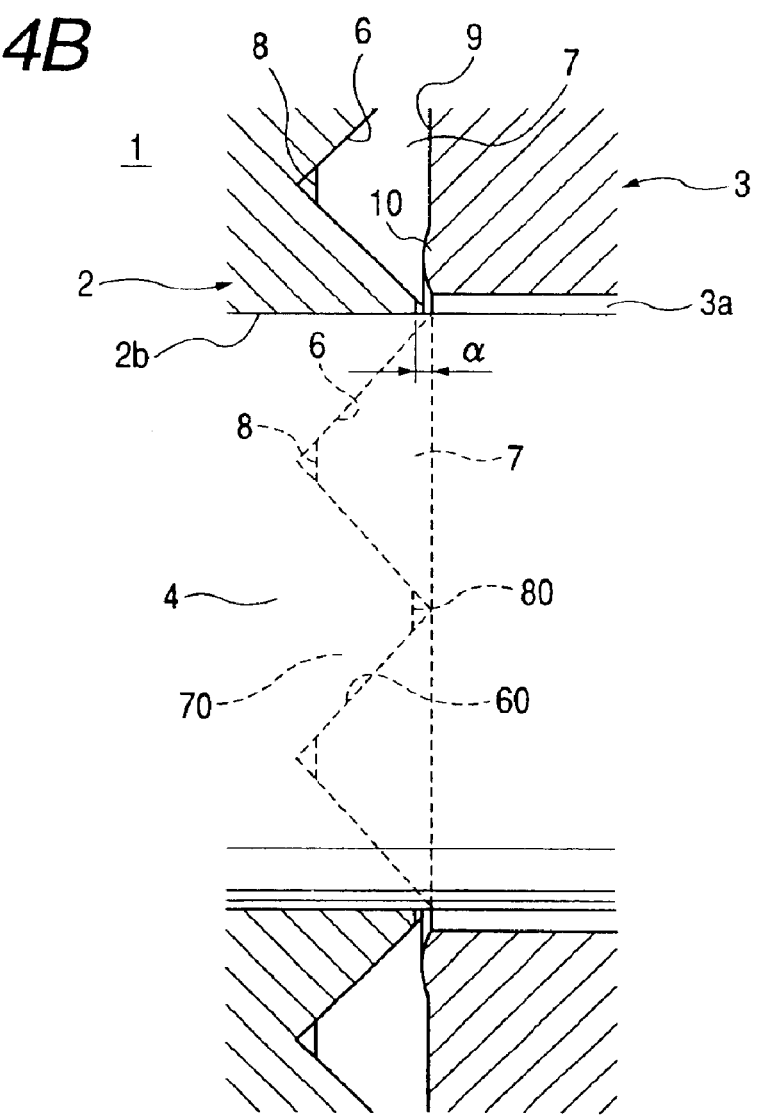
FIG. 4B is a partially enlarged view of FIG. 4A.

However, on the abdominal face of the insert 3, a flat convex line missing part 9 is provided in a region including the periphery of an opening edge of the screw insertion hole 3a and opposed to the tip mounting face 2a of the holder 2. The convex line missing part 9 as shown is flush with a root of the concave grooves 60, i.e., flush with the base of the convex lines 7. The convex line missing part 9 is formed flat, but when the screw insertion hole 3a is punched, a slightly swollen deformation portion 10 is produced in a peripheral portion (see a slanting line portion in FIG. 6) of the opening edge of the screw insertion hole 3a, as shown in FIGS. 4B and 5B. The swollen deformation portion 10 as shown in FIGS. 4B and 5B is exaggerated to make the understanding easier, and the actual swollen deformation portion 10 is 0.05 mm or less thick with a tip thickness of 6.5 mm. If the convex lines 70 on the tip mounting face 2a of the holder 2 abuts against this swollen deformation portion 10, the mounting precision of the insert 3 is degraded, whereby a clearance α between the top portion of the convex lines 70 (chamfered portion 80) and the convex line missing part 9 is set to be slightly larger to surpass a deformation amount of the swollen deformation portion 10. The set value of clearance α may be decided in consideration of various conditions, including the tip thickness, tip material, and the boring method, but actually may be in a range from 0.05 mm to 0.5 mm to deal with most of the cases. In this connection, the clearance α is set at 0.1 mm with a tip thickness of 6.5 mm in the first embodiment.

A procedure for assembling the cutting tool 1 of the invention will be described below. First of all, the convex lines 7 of the insert 3 are fitted into the concave grooves 6 of the tip mounting face 2a, and the step portion 3d of the insert 3 is engaged in the engagement step portion 2c of the tip mounting face 2a. In this state, the tip mounting face 2a of the holder 2 and the abdominal face of the insert 3 are mated with each other, and the tip mounting face 2a of the holder 2 traverses over the convex line missing part 9 of the insert 3. However, even if the tip mounting face 2a of the holder 2 transverses over the convex line missing part 9 of the insert 3, the convex line missing part 9 has no convex lines, and there is the clearance α surpassing the deformation amount of the swollen deformation portion 10 between the convex line missing part 9 and the tip mounting face 2a (the top portion of the convex lines 70), whereby there is no fear that both are contacted. Accordingly, the insert 3 is stabilized on the tip mounting face 2a of the holder 2.

In this state, the insert 3 is tightened by the clamp screw 4 through the screw insertion hole 3a of the insert 3. By tightening this clamp screw 4, the tip mounting face 2a of the holder 2 and the abdominal face of the insert 3 are integrated firmly by engagement between the concave grooves 6 and the convex lines 7, whereby it is unnecessary to have the conventional restricting wall 106 of the holder 2. As will be clear from a cross sectional view of FIG. 5A, the cutting edge 3b on the rear side of the insert 3 is out of contact with the holder 2.

And if one cutting edge 3b is naturally exhausted or broken, the clamp screw 4 is removed, the insert 3 is rotated, and the clamp screw is tightened again. As will be apparent from the above description of this invention, the insert 3 is fully restricted by engagement between the abdominal face of the insert 3 and the tip mounting face 2a, and the cutting edge 3b is not the component for restricting the insert 3, whereby even if the cutting edge 3b is broken, the insert 3 is fully restricted.

A performance test of the cutting tool 1 of this invention has been conducted. The insert 3 as shown was produced by setting the cutting edge width to 3 mm, the knife edge lead angle to 0°, and the knife edge corner R to 0.05 mm, and mounted on the holder 2 as shown. Further, a round bar made of material SCM 415 and having a diameter of 20 mm was revolved at 2000 rpm, and a cutting-off work was performed by the cutting tool 1. The feed per revolution was set to F0.03, F0.06, F0.08 and F0.10 to check the cutting condition, in which the cutting-off work can be performed in all the cases without problem. It is confirmed that the chips are rolled by the dimple groove 3*c* for cutting work provided on the knife edge rake face of the insert 3, namely, the dimple groove 3*c* effectively acted as a measure for preventing the work from being damaged due to chips.

Figure 7:
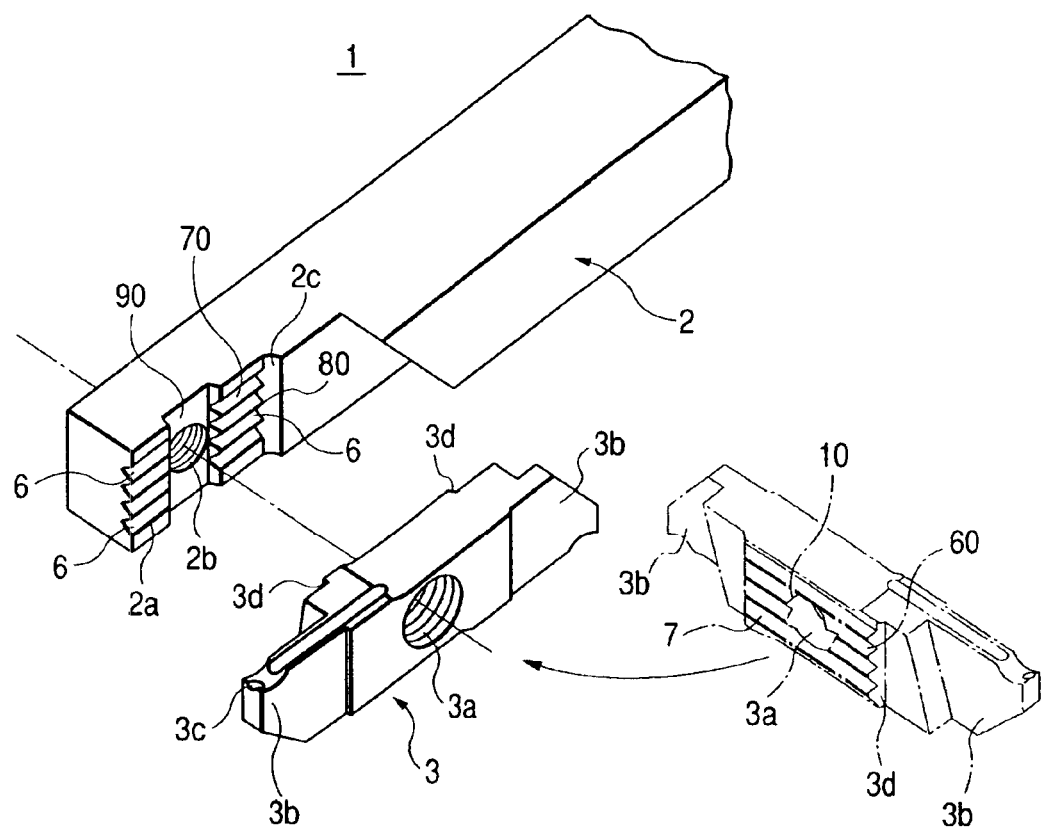
FIG. 7 is an exploded perspective view of the cutting tool.
Figure 8:
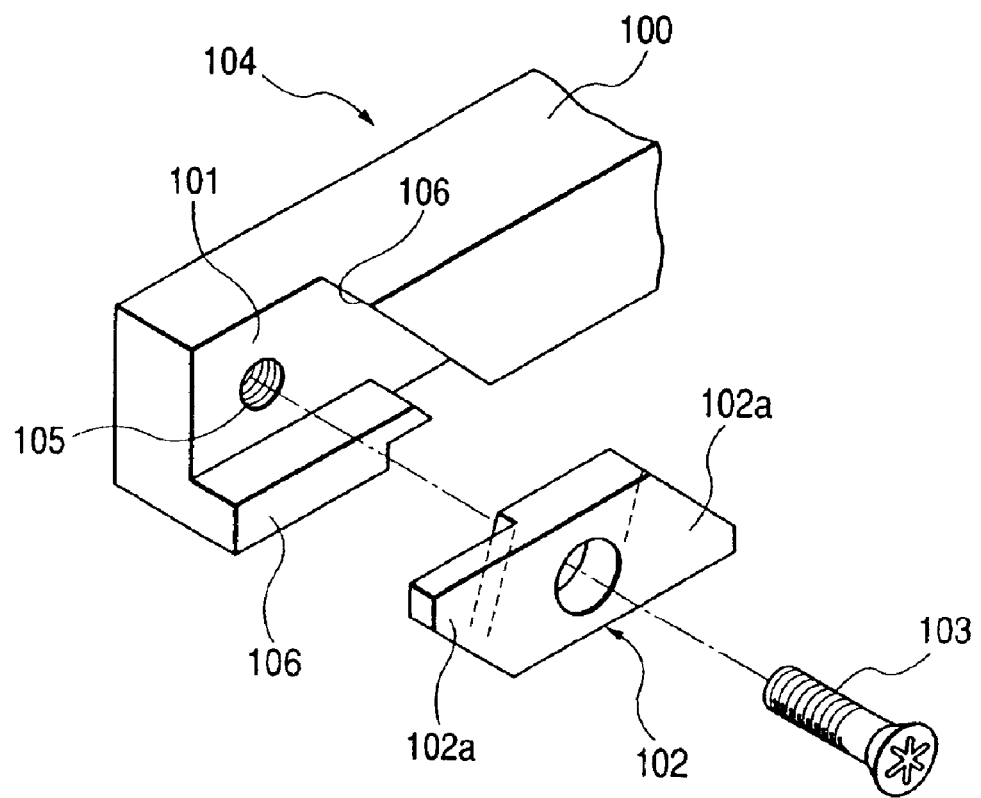
FIG. 8 is an exploded perspective view showing the conventional art.

Referring now to FIG. 7, a second exemplary embodiment of the invention will be described below. FIG. 7 is an exploded perspective view of the cutting tool.

In this embodiment, a convex line missing part 90 is provided in a region including the periphery of the opening edge of the female thread hole 2*b* on the tip mounting face 2*a* of the holder 2 and opposed to the insert 3. In this case, because the swollen deformation portion 10 is produced in the opening edge of the screw insertion hole 3*a* of the insert 3, the bevels of the convex lines 7 are partially swollen. However, there is no factor for decreasing the mounting precision of the insert 3, since the deformation portion corresponds to the convex line missing part 90 of the holder 2.

This invention is described above, but is not limited to those described embodiments. For example, in the embodiments, the concave grooves 6 are formed on the tip mounting face 2*a*, and the convex lines 7 are formed on the abdominal face of the insert 3. However, the convex lines 70 may be formed on the tip mounting face 2*a* and the concave grooves 60 may be formed on the abdominal face of the insert 3, as already described.

Further, the concave grooves 6 of the embodiments are V-shaped, but they may be semi-circular or rectangular in section. The same is true with the convex lines 7, because the shape of the convex lines corresponds to the shape of the concave grooves 6. Though being not particularly limited, the number of concave grooves 6 (convex lines 7) is optimally from three to five, deducing the functional size of concave grooves 6 from the standard area of the tip mounting face 2*a*.

The insert 3 of the embodiments has a basic form of a parallelogram, but may have a basic form of rectangle. In this invention, the insert 3 is fully restricted only by engagement between the abdominal face of the insert 3 and the tip mounting face 2*a*, whereby the insert 3 having the basic form of a parallelogram and the insert 3 having the basic form of a rectangle may be appropriately used in one holder 2.

Further, in the embodiments, the clamping member has a screw clamp structure, but may be a well-known clamp (not shown) of the so-called clamp-on in which the insert 3 is clamped on the tip mounting face 2*a*. Though the cutting-off work is only performed in the performance test, the grooving, cutting with a saw, and thread cutting work may be also effectively performed with the excellent performance.

By the way, though the concave grooves 6, 60 and the convex lines 7, 70 are described separately in the embodiments, the concave grooves 6, 60 and the concave grooves 6, 60 may be connected and the convex lines 7, 70 and the convex lines 7, 70 may be connected to constitute a serration groove of the almost same specification. Hence, this invention may be directed to the insert, holder and cutting tool in which the serration groove of the same specification is formed on the tip mounting face of the holder and the abdominal face of the insert, and the insert is fixed by the clamping member in the state where the serration grooves mated together. In this case, the concave grooves and the convex lines in the embodiments may be replaced with the serration groove. Further, if a clearance is provided between the chamfered top portion of crest of the serration groove and the root, the taper faces of the serration groove may be securely contacted by tightening the clamp screw 4, remarkably increasing the mounting precision of the insert 3.

With the invention, because the tip mounting face of the holder and the abdominal face of the insert are securely integrated by engagement between a plurality of concave grooves and convex lines, the restricting wall of the holder is dispensed with. Accordingly, even if one cutting edge of the insert is broken away, another cutting edge is usable without being affected. As a result of dispensing with the restricting wall of the holder, the height of the tip mounting face can be consistent with the height of the insert, whereby the cutting tool is slimmed. Further, in working the screw insertion hole or the female thread hole, the periphery of the opening edge of hole may be swollen and deformed in some cases, in which the convex line missing part is provided in that portion to prevent the tip mounting face and the insert from being connected, thereby enhancing the mounting precision of the insert.

Further, if the clamping member has a screw clamp structure of one clamp screw, the insert is promptly mounted or detached.

While the present invention has been particularly shown and described with reference to the above, it will be understood by those of skill in the art that various changes in form and detail may be made therein without departing from the spirit and scope of the present invention as defined by the following claims.

What is claimed is:

1. An insert comprising:

a clamping member; and a parallelogram shaped body that is detachably mounted by said clamping member on a tip mounting face of a holder, wherein two or more concave grooves are formed like parallel stripes on said tip mounting face of said holder;

two or more convex lines are formed on an abdominal face of said parallelogram shaped body to be fitted in said concave grooves of said holder;

said parallelogram shaped body is clamped by said clamping member to said holder so that the convex lines are fitted in the concave grooves on said tip mounting face;

said clamping member fixes said parallelogram shaped body to said holder by tightening a clamp screw through a screw insertion hole of said parallelogram shaped body into a female thread hole on said tip mounting face; and a flat convex line missing part is provided in a region of said parallelogram shaped body which includes a periphery of an opening edge of said screw insertion hole and is opposed to said tip mounting face of said holder when said parallelogram shaped body is fixed to said holder, and wherein said tip mounting face and said flat convex line missing part are out of contact at least before tightening said clamp screw, and wherein said flat convex line missing part is flush with a base of said convex lines.

2. The insert according to claim 1, wherein the number of said convex lines is from three to five.

3. The insert according to claim 1, wherein said one screw insertion hole is formed in a center area of said parallelogram shaped body, and said parallelogram shaped body is tightened by one clamp screw.

4. The insert according to claim 1, further comprising:

a step portion formed on an abdominal face of said parallelogram shaped body in a direction transverse to said convex lines, wherein said parallelogram shaped body is positioned in such a manner that said step portion is engaged with an engagement step portion provided on said holder.

5. The insert according to claim 1, wherein said insert is used for cutting or grooving work.

6. The insert according to claim 1, wherein a dimple groove for cutting work is provided on a knife edge rake face of said parallelogram shaped body.

7. A holder comprising:

a clamping member; and a tip mounting face, said holder is capable of holding an insert that is detachably mounted by said clamping member on said tip mounting face thereof, wherein two or more concave grooves are formed as parallel stripes on an abdominal face of said insert;

two or more convex lines are formed on said tip mounting face of said holder to be fitted in said concave grooves of said insert, wherein said insert is clamped by said clamping member in a state where said concave grooves of said insert are fitted in said convex lines on said tip mounting face of said holder;

said clamping member fixes said insert to said holder by tightening a clamp screw through a screw insertion hole of said insert into a female thread hole on said tip mounting face of said holder; and a flat convex line missing part is provided in a region that includes a periphery of an opening edge of said female thread hole and opposed to said insert, wherein said insert and said convex line missing part are out of contact at least before tightening the clamp screw, wherein said insert has a cutting edge, and wherein said flat convex line missing part is flush with a base of said convex lines.

8. The holder according to claim 7, wherein the number of said convex lines is from three to five.

9. The holder according to claim 7, wherein one female thread hole is formed in the center of said tip mounting face, and said insert is tightened by one clamp screw.

10. The holder according to claim 7, wherein an engagement step portion is formed in a direction traversing said convex lines, and said insert is fixed to said holder so that a step portion provided on an abdominal face of said insert is engaged in said engagement step portion of said holder.

11. The holder according to claim 7, wherein said insert is used for the cutting or grooving work.

12. The insert according to claim 1, wherein said insert is a part of a cutting tool, and said insert is held in said holder.

13. The holder according to claim 7, wherein said holder is a part of a cutting tool and insert is held in said holder.

* * * * *